(12) United States Patent  
Yan et al.

(10) Patent No.: US 11,994,111 B2  
(45) Date of Patent: May 28, 2024

(54) WIND POWER CONSUMPTION METHOD OF VIRTUAL POWER PLANT WITH CONSIDERATION OF COMPREHENSIVE DEMAND RESPONSES OF ELECTRICAL LOADS AND HEAT LOADS

(71) Applicant: North China Electric Power University, Beijing (CN)

(72) Inventors: Min Yan, Beijing (CN); Heping Jia, Beijing (CN); Dunnan Liu, Beijing (CN); Yongquan Chen, Beijing (CN)

(73) Assignee: North China Electric Power University, Beijing (CN)

( * ) Notice: Subject to any disclaimer, the term of this patent is extended or adjusted under 35 U.S.C. 154(b) by 0 days.

(21) Appl. No.: 17/699,075

(22) Filed: Mar. 19, 2022

(65) Prior Publication Data

US 2022/0299009 A1     Sep. 22, 2022

(30) Foreign Application Priority Data

Mar. 19, 2021 (CN) .......................... 202110296018.0

(51) Int. Cl.  
*F03D 7/04*     (2006.01)  
*F03D 7/02*     (2006.01)  
(Continued)

(52) U.S. Cl.  
CPC ........... *F03D 7/048* (2013.01); *F03D 7/0284* (2013.01); *H02J 3/003* (2020.01); *H02J 3/004* (2020.01);  
(Continued)

(58) Field of Classification Search  
CPC .......... F03D 7/0248; F03D 7/048; F03D 9/22; F03D 9/257; H02J 3/003; H02J 3/004;  
(Continued)

(56) References Cited

U.S. PATENT DOCUMENTS 8,892,264 B2 * 11/2014 Steven ................... G06Q 10/06  
                                                                700/286  
9,367,052 B2 * 6/2016 Steven ................... G05B 13/02  
(Continued)

FOREIGN PATENT DOCUMENTS

CN         113612258 A     11/2021  
CN         113690940 A     11/2021

*Primary Examiner* — Tulsidas C Patel  
*Assistant Examiner* — Thomas K Quigley (57) ABSTRACT

The present invention discloses a wind power consumption method of a virtual power plant with consideration of comprehensive demand responses of electrical loads and heat loads, which comprises: establishing a wind turbine output model, so as to obtain a wind power prediction curve; establishing heat load demand models before/after demand responses and heat supply equipment output models before/after the demand responses, so as to obtain the abandoned wind quantities per moment before/after the demand responses and the total abandoned wind quantities before/after the demand responses; judging that whether consumption is promoted or not according to the total abandoned wind quantities before/after the demand responses; and (Continued)

establishing a storage battery capacity model and judging the charging/discharging state and the charging/discharging capacity of a storage battery.

10 Claims, 4 Drawing Sheets

(51) Int. Cl.
   *H02J 3/00* (2006.01)
   *H02J 3/38* (2006.01)
   *F03D 9/22* (2016.01)
   *F03D 9/25* (2016.01)

(52) U.S. Cl.
   CPC ............... *H02J 3/381* (2013.01); *F03D 9/22* (2016.05); *F03D 9/257* (2017.02); *F05B 2270/1033* (2013.01); *F05B 2270/337* (2013.01); *F05B 2270/404* (2013.01); *H02J 2300/28* (2020.01)

(58) Field of Classification Search
   CPC ................... H02J 3/381; H02J 2300/28; F05B 2270/1033; F05B 2270/337; F05B 2270/404
   See application file for complete search history.

(56) References Cited

U.S. PATENT DOCUMENTS

| | | | | |
|---|---|---|---|---|
| 9,772,643 | B2* | 9/2017 | Steven | G05B 13/026 |
| 2007/0110579 | A1* | 5/2007 | Ross, Sr. | F03D 3/068 |
| | | | | 416/132 B |
| 2009/0293502 | A1* | 12/2009 | Vandor | F25J 1/0284 |
| | | | | 165/104.21 |
| 2010/0152905 | A1* | 6/2010 | Kusiak | G05B 17/02 |
| | | | | 700/289 |
| 2011/0089693 | A1* | 4/2011 | Nasiri | F03D 7/0272 |
| | | | | 290/44 |
| 2012/0296482 | A1* | 11/2012 | Steven | G06Q 40/04 |
| | | | | 700/291 |
| 2013/0204443 | A1* | 8/2013 | Steven | G05B 13/04 |
| | | | | 700/286 |
| 2013/0245847 | A1* | 9/2013 | Steven | G06Q 10/00 |
| | | | | 700/291 |
| 2014/0316973 | A1* | 10/2014 | Steven | H02J 3/008 |
| | | | | 705/37 |
| 2015/0326015 | A1* | 11/2015 | Steven | G06Q 10/00 |
| | | | | 700/291 |
| 2016/0363948 | A1* | 12/2016 | Steven | G06Q 10/00 |
| 2021/0281080 | A1* | 9/2021 | Danielsen | H02J 1/14 |

* cited by examiner

WIND POWER CONSUMPTION METHOD OF VIRTUAL POWER PLANT WITH CONSIDERATION OF COMPREHENSIVE DEMAND RESPONSES OF ELECTRICAL LOADS AND HEAT LOADS

CROSS REFERENCES TO RELATED APPLICATIONS

The present application claims foreign priority of Chinese Patent Application No. 202110296018.0, filed on Mar. 19, 2021 in the China National Intellectual Property Administration, the disclosures of all of which are hereby incorporated by reference.

TECHNICAL FIELD

The present invention belongs to field of consumption of abandoned wind, and particularly relates to a wind power consumption method of a virtual power plant with consideration of comprehensive demand responses of electrical loads and heat loads.

BACKGROUND OF THE PRESENT INVENTION

Clean energy is greatly developed due to environmental protection and renewability thereof, but at the same time, a lot of problems are caused, wherein due to the characteristics of randomness and volatility of wind power, a power grid is impacted by wind power integration; and the energy utilization rate is lower. Therefore, a wind power consumption method is studied, which has great significance for reducing abandoned wind.

Comprehensive energy scattered in a region is gathered and controlled by a virtual power plant through an advanced communication technology, so that a power generation and distribution system with excellent controllability is formed, and an effective way is provided for wind power consumption. Due to the continuous growth of various types of loads represented by electrical loads and heat loads in the power generation and distribution system, the operation of the virtual power plant needs to be coordinated and optimized. As controllable loads participate in demand responses, the economy of the system can be improved; the energy consumption capacity of the virtual power plant can also be improved; and the problem of local consumption of abandoned wind is alleviated. Therefore, it is necessary to consider comprehensive demand responses of various loads, such as comprehensive demand responses of the electrical loads and the heat loads, in order to effectively promote the wind power consumption of the virtual power plant.

SUMMARY OF PRESENT INVENTION

The present invention aims to provide a wind power consumption method of a virtual power plant with consideration of comprehensive demand responses of electrical loads and heat loads for the operation cost of the virtual power plant.

The present invention provides a method for consuming wind power, considering the comprehensive of demand response of electrical load and heat load. The method includes the following steps:

establishing a wind turbine power model to obtain a wind power prediction curve;

establishing a pre-demand-response heat load demand model and a pre-demand-response electrical boiler output model; determining a pre-demand-response heat load demand based on the pre-demand-response heat load demand model; calculating a pre-demand-response wind power consumption of the electrical boiler according to the pre-demand-response electrical boiler output model and the pre-demand-response heat load demand; calculating a pre-demand-response abandoned wind power per moment and a pre-demand-response total abandoned wind power according to the wind power prediction curve, the pre-demand-response electrical load demand, and the pre-demand-response wind power consumption of the electrical boiler;

establishing a post-demand-response heat load demand model and a post-demand-response electrical boiler output model; determining a post-demand-response heat load demand based on the post-demand-response heat load demand model; calculating a post-demand-response wind power consumption of the electrical boiler according to the post-demand-response electrical boiler output model and the post-demand-response heat load demand;

calculating a post-demand-response electrical load; calculating a post-demand-response abandoned wind power per moment and a post-demand-response total abandoned wind power according to the wind power prediction curve, the post-demand-response electrical load demand, and the post-demand-response wind power consumption of the electrical boiler; then obtaining a difference value between the pre-demand-response total abandoned wind power and the post-demand-response total abandoned wind power; promoting wind power consumption if the difference value is greater than 0; and establishing a storage battery capacity model; determining a charging-discharging state and a charging-discharging capacity of the storage battery according to the storage battery capacity model and the post-demand-response abandoned wind power per moment.

The wind turbine output model is:

$$g_{WPP}(t) = \begin{cases} 0, & v_t \leq v_{in} \\ \dfrac{v_t - v_{in}}{v_R - v_{in}} g, & v_{in} \leq v_t \leq v_R \\ g, & v_R \leq v_t \leq v_{out} \\ 0, & v_t \geq v_{out} \end{cases}$$

Where, $g$ represents a rated power of the wind turbine; $v_{in}$ represents a cut-in wind speed of the wind turbine; $v_R$ represents a rated wind speed of the wind turbine; $v_{out}$ represents a cut-out wind speed of the wind turbine; $v_t$ represents a real-time wind speed of the wind turbine at time t; t denotes the specific moment; and $g_{WPP}(t)$ represents an actual output of the wind turbine at time t.

The actual output of the wind turbine meets the following constraint condition:

$$g_{WPP}^{min} \leq g_{WPP}(t) \leq g_{WPP}^{max}$$

Where, $g_{WPP}^{min}$ represents a lower power limit of the wind turbine, and $g_{WPP}^{max}$ represents an upper power limit of the wind turbine.

The pre-demand-response heat load demand model is:

$$Q_{heart}^1(t) = \sum_{t=1}^{24}(C_{air}\rho_{air}NSH + \partial KA)(T_{PMV}^1 - T_{out}(t)) - Q_{inc} - Q_{inh}$$

Where, $Q_{heart}^1(t)$ represents the pre-demand response heat load demand; $\partial$ represents a modified temperature difference factor of an envelope enclosure; K represents a heat transfer coefficient of the envelope enclosure; A represents an area of the envelope enclosure; $T_{out}(t)$ represents an outdoor temperature at time t; $C_{air}$ represents a specific heat capacity of air; $\rho_{air}$ represents an air density; N represents an air change rate; S represents an area of a building; H represents an indoor height of the building; $Q_{ine}$ represents a calorific value of an electrical equipment; $Q_{inh}$ represents a calorific value of a human body; and $T_{PMV}^1$ represents a pre-demand-response set indoor temperature.

The pre-demand-response set indoor temperature $T_{PMV}^1$ is obtained by the following formula:

$$T_{PMV}^1 = T_S - \frac{M(2.43 - \lambda_{PMV}^1)(I_{cl} + 0.1)}{3.76}$$

Where, $T_s$ represents a human skin temperature in a normal temperature state; M represents a human energy metabolism rate; $\lambda_{PMV}^1$ represents an initial PMV (Predicted Mean Vote) index; and $I_{cl}$ represents a dress heat resistance.

The pre-demand-response electrical boiler output model is:

$$Q_{EB}^1(t) = g_{EB}^1(t) \cdot \eta_{EB}$$

Where, $Q_{EB}^1(t)$ represents a pre-demand-response heat supply of the electrical boiler at the time t; $g_{EB}^1(t)$ represents the pre-demand-response wind power consumption of the electrical boiler at time t; and $\eta_{EB}$ represents an electricity-heat conversion efficiency.

A pre-demand-response actual output of the electrical boiler meets the following constraint condition:

$$Q_{EB}^{1min} \leq Q_{EB}^1(t) \leq Q_{EB}^{1max}$$

Where, $Q_{EB}^{1min}$ represents a pre-demand-response lower power limit of the electrical boiler; $Q_{EB}^{1max}$ represents a pre-demand-response upper power limit of the electrical boiler; and $Q_{EB}^1(t)$ represents the pre-demand-response actual output of the electrical boiler at the moment t.

$Q_{EB}^1(t)$ is equal to $Q_{heart}^1(t)$; and an pre-demand-response output of the electrical boiler at time t is obtained based on the pre-demand-response heat load demand $Q_{heart}^1(t)$, and then the pre-demand-response wind power consumption $g_{EB}^1(t)$ of the electrical boiler is obtained based on the pre-demand-response electrical boiler output model.

The pre-demand-response abandoned wind power per moment and the pre-demand-response total abandoned wind power are obtained by the following formulas, respectively:

$$g_W^1(t) = g_{WPP}(t) - g_E^1(t) - g_{EB}^1(t)$$

$$g_W^1 = \sum_{t=1}^{24} g_W^1(t)$$

Where, $g_W^1$ represents the pre-demand-response total abandoned wind power; $g_W^1(t)$ represents the pre-demand-response abandoned wind power at time t; $g_E^1(t)$ represents the pre-demand-response electrical load demand at time t; and $g_{EB}^1(t)$ represents the pre-demand-response wind power consumption of the electrical boiler.

The post-demand-response heat load demand model is:

$$Q_{heart}^2(t) = \sum_{t=1}^{24}(C_{air}\rho_{air}NSH + \partial KA)(T_{PMV}^2 - T_{out}(t)) - Q_{inc} - Q_{inh}$$

Where, $Q_{heart}^2(t)$ represents the post-demand response heat load demand; $T_{PMV}^2$ represents a post-demand-response set indoor temperature; $\partial$ represents the modified temperature difference factor of an envelope enclosure; K represents the heat transfer coefficient of the envelope enclosure; A represents the area of the envelope enclosure; $T_{out}(t)$ represents the outdoor temperature at time t; $C_{air}$ represents the specific heat capacity of air; $\rho_{air}$ represents the air density; N represents the air change rate; S represents the area of a building; H represents the indoor height of the building; $Q_{ine}$ represents the calorific value of the electrical equipment; $Q_{inh}$ represents the calorific value of the human body.

The post-demand-response set indoor temperature $T_{PMV}^2$ is obtained by the following formula:

$$T_{PMV}^2 = T_S - \frac{M(2.43 - \lambda_{PMV}^2)(I_{cl} + 0.1)}{3.76}$$

Where, $T_s$ represents the human skin temperature in normal temperature state; M represents the human energy metabolism rate; $\lambda_{PMV}^2$ represents the initial PMV index; and $I_{cl}$ represents the dress heat resistance.

The post-demand-response electrical boiler output model is:

$$Q_{EB}^2(t) = g_{EB}^2(t) \cdot \eta_{EB}$$

Where, $Q_{EB}^2(t)$ represents a post-demand-response heat supply of the electrical boiler at the time t; $g_{EB}^2(t)$ represents the post-demand-response wind power consumption of the electrical boiler at time t; and $\eta_{EB}$ represents an electricity-heat conversion efficiency.

A post-demand-response actual output of the electrical boiler meets the following constraint condition:

$$Q_{EB}^{2min} \leq Q_{EB}^2(t) \leq Q_{EB}^{2max}$$

Where, $Q_{EB}^{2min}$ represents a post-demand-response lower power limit of the electrical boiler; $Q_{EB}^{2max}$ represents a post-demand-response upper power limit of the electrical boiler; and $Q_{EB}^2(t)$ represents the post-demand-response actual output of the electrical boiler at the moment t.

$Q_{EB}^2(t)$ is equal to $Q_{heart}^2(t)$; and an post-demand-response output of the electrical boiler at time t is obtained based on the post-demand-response heat load demand $Q_{heart}^2(t)$, and then the post-demand-response wind power consumption $g_{EB}^2(t)$ of the electrical boiler is obtained based on the post-demand-response electrical boiler output model.

The demand of the post-demand-response electrical load demand is obtained by following steps:
calculating variations of the post-demand-response electrical load per moment by the following formulas:

$$\Delta g_{on}(t) = e_{on} \times g_{on}(t) \times \frac{\Delta P_{on}(t)}{P_{on}(t)}, t \in T_{on}$$

-continued $$\Delta g_{mind}(t) = e_{mind} \times g_{mind}(t) \times \frac{\Delta P_{mind}(t)}{P_{mind}(t)}, t \in T_{mind}$$

$$\Delta g_{off}(t) = e_{off} \times g_{off}(t) \times \frac{\Delta P_{off}(t)}{P_{off}(t)}, t \in T_{off}$$

where, $\Delta g_{on}(t)$, $\Delta g_{mind}(t)$ and $\Delta g_{off}(t)$, respectively, represents a variation of the post-demand-response electrical load at the peak period, the flat period, and the valley period of power consumption; $g_{on}(t)$, $g_{mind}(t)$ and $g_{off}(t)$, respectively, represents the pre-demand-response electrical load at the peak period, the flat period, and the valley period of power consumption; $P_{on}(t)$, $P_{mind}(t)$ and $P_{off}(t)$, respectively, represents the pre-demand-response energy consumption at the peak period, the flat period, and the valley period of power consumption; $\Delta P_{on}(t)$, $\Delta P_{mind}(t)$ and $\Delta P_{off}(t)$, respectively, represents a variation of energy consumption at the peak period, the flat period, and the valley period of power consumption; $e_{on}$, $e_{mind}$ and $e_{off}$, respectively, represents an elastic coefficient of energy consumption at the peak period, the flat period, and the valley period of power consumption; and $T_{on}$ represents the peak period of energy consumption, $T_{mind}$ represents the flat period of energy consumption, and $T_{off}$ represents the valley period of energy consumption; and obtaining the post-demand-response electrical load per moment $g_{EB}^2(t)$ by adding variations of the post-demand-response electrical load per moment and the pre-demand-response electrical load per moment $g_{EB}^1(t)$.

The post-demand-response abandoned wind power per moment and the post-demand-response total abandoned wind power are respectively obtained by the following formulas:

$$g_W^2(t) = g_{WPP}(t) - g_E^2(t) - g_{EB}^2(t)$$

$$g_W^2 = \sum_{t=1}^{24} g_W^2(t)$$

Where, $g_W^2$ represents the post-demand-response total abandoned wind power; $g_W^2(t)$ represents the post-demand-response abandoned wind power at time t; $g_E^2(t)$ represents the post-demand-response electrical load demand at time t; and $g_{EB}^2(t)$ represents the post-demand-response wind power consumption of the electrical boiler at time t.

The storage battery capacity model is:

$$S_{soc}(t) = S_{soc}(t-1) + (S_{ch}(t) - S_{dis}(t))$$

$$S_{ch}(t) = g_{ch}(t)\eta_{ch}$$

$$S_{dis}(t) = g_{dis}(t)\eta_{dis}$$

Where, $S_{soc}(t)$ represents the capacitance of the storage battery at time t; $S_{soc}(t-1)$ represents the capacitance of the storage battery at time t−1; $S_{ch}(t)$ represents the charging capacity of the storage battery at time t; $S_{dis}(t)$ represents the discharging capacity of the storage battery at time t; $g_{ch}(t)$ represents the charging power of the storage battery at time t; $\eta_{ch}$ represents the charging efficiency of the storage battery; $g_{dis}(t)$ represents the discharging power of the storage battery at time t; and $\eta_{dis}$ represents the discharging efficiency of the storage battery.

The capacity of the storage battery meets the following constraint condition:

$$S_{soc}^{min}(t) \leq S_{soc}(t) \leq S_{soc}^{max}(t)$$

Where, $S_{soc}^{min}(t)$ represents the minimum charging capacity of the storage battery, and the $S_{soc}^{max}(t)$ represents the maximum charging capacity of the storage battery.

The output constraint of the storage battery meets the following constraint condition:

$$g_{ch}^{min} \leq g_{ch}(t) \leq g_{ch}^{max}$$

$$g_{dis}^{min} \leq g_{dis}(t) \leq g_{dis}^{max}$$

Where, $g_{ch}^{min}$ represents the minimum charging power of the storage battery; $g_{ch}^{max}$ represents the maximum charging power of the storage battery; $g_{dis}^{min}$ represents the minimum discharging power of the storage battery; and $g_{dis}^{max}$ represents the maximum discharging power of the storage battery.

When the actual output $g_{WPP}(t)$ of the wind turbine at time t is less than the sum of $g_{EB}^2(t)$ and $g_E^2(t)$, the $g_W^2(t)$ is less than 0; and when the actual output $g_{WPP}(t)$ of the wind turbine at time t is greater than or equal to the sum of $g_{EB}^2(t)$ and $g_E^2(t)$, the $g_W^2(t)$ is greater than or equal to 0.

when the post-demand-response abandoned wind power at time t, $g_W^2(t)$, is less than 0, the storage battery is configured to assist in power supply to the electrical boiler and the electrical load.

When the post-demand-response abandoned wind power at time t, $g_W^2(t)$, is greater than or equal to 0, the storage battery is configured receive power from the wind turbine, and the charging capacity of the storage battery at time t, $S_{ch}(t)$, is equal to the post-demand-response abandoned wind power at time t, $g_W^2(t)$. Namely, $g_W^2(t) = S_{ch}(t)$.

The discharging capacity of the storage battery at time t, $S_{dis}(t)$ is equal to an absolute value of the post-demand-response abandoned wind power at time t, $g_W^2(t)$. Namely, $|g_W^2(t)| = S_{dis}(t)$.

The working principle of the storage battery is: under the conditions that the wind power is sufficient, and abandoned wind is generated, the abandoned wind quantity is stored; when the wind power is insufficient to provide the required electrical loads, the storage battery is configured to discharge to assist the wind turbine to supply power.

The virtual power plant of the present invention comprises the electrical boiler, the storage battery and the wind turbine.

The present invention has the beneficial effects that:

According to the method, power utilization and heat utilization can be reasonably guided, the energy utilization rate is improved, and the operation cost of the virtual power plant is lowered; the method has the reference value for wind power consumption of the virtual power plant with the consideration that the comprehensive demand responses are implemented on various loads, and the scientific basis is provided for more efficiently improving the energy utilization rate; and an effective way is provided for lowering the operation cost of a power generation and distribution system, such as the virtual power plant, and the like.

DETAILED DESCRIPTION OF PREFERRED EMBODIMENTS

The present invention is further described in detail hereinafter through combination with the drawings and specific embodiments.

In the implementation of the present invention, the present invention is implemented according to the specific steps in the contents of the description and the contents of the claims, and the specific step process is not described here.

Figure 1:
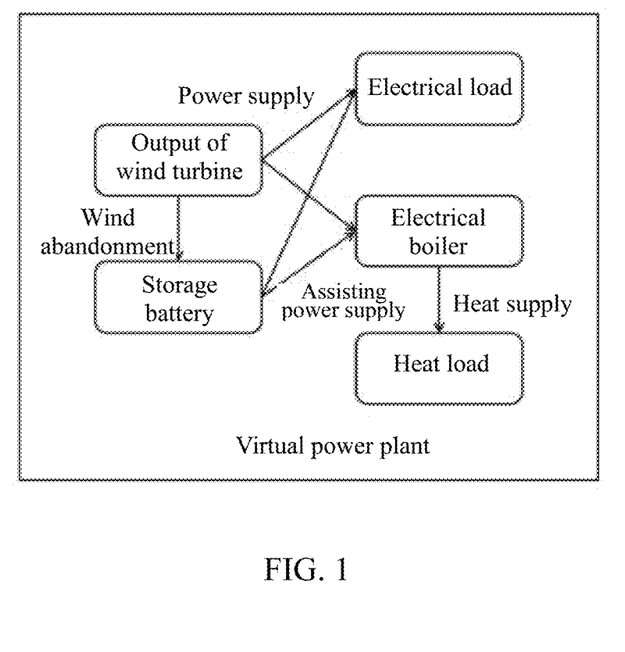
FIG. 1 is a schematic diagram of wind power consumption of a virtual power plant of the present invention.

The embodiments of the present invention are described as follows:

Embodiments of the present invention provides a method for consuming win power in a virtual power plant, considering the comprehensive demand responses of electrical load and heat load. Referring to FIG. 1, the virtual power plant includes an electrical boiler, a storage battery, and a wind turbine. The wind turbine is capable of supplying wind power to the electrical boiler and an electrical load, while the rest power, e.g., abandoned wind power, generated by the wind turbine is capable of being supplied to the storage battery. The storage battery is capable of supplying power to the electrical load, and assisting in power supply to the electrical boiler when needed. The electrical boiler is capable of providing heat supply to a heat load.

establishing a wind turbine power model to obtain a wind power prediction curve;

establishing a pre-demand-response heat load demand model and a pre-demand-response electrical boiler output model; determining a pre-demand-response heat load demand based on the pre-demand-response heat load demand model; calculating a pre-demand-response wind power consumption of the electrical boiler according to the pre-demand-response electrical boiler output model and the pre-demand-response heat load demand; calculating a pre-demand-response abandoned wind power per moment and a pre-demand-response total abandoned wind power according to the wind power prediction curve, the pre-demand-response electrical load demand, and the pre-demand-response wind power consumption of the electrical boiler;

establishing a post-demand-response heat load demand model and a post-demand-response electrical boiler output model; determining a post-demand-response heat load demand based on the post-demand-response heat load demand model; calculating a post-demand-response wind power consumption of the electrical boiler according to the post-demand-response electrical boiler output model and the post-demand-response heat load demand;

calculating a post-demand-response electrical load; calculating a post-demand-response abandoned wind power per moment and a post-demand-response total abandoned wind power according to the wind power prediction curve, the post-demand-response electrical load demand, and the post-demand-response wind power consumption of the electrical boiler; then obtaining a difference value between the pre-demand-response total abandoned wind power and the post-demand-response total abandoned wind power; promoting wind power consumption if the difference value is greater than 0; and establishing a storage battery capacity model; determining a charging-discharging state and a charging-discharging capacity of the storage battery according to the storage battery capacity model and the post-demand-response abandoned wind power per moment.

The wind turbine output model is:

$$g_{WPP}(t) = \begin{cases} 0, & v_t \le v_{in} \\ \dfrac{v_t - v_{in}}{v_R - v_{in}} g, & v_{in} \le v_t \ge v_R \\ g, & v_R \le v_t \le v_{out} \\ 0, & v_t \ge v_{out} \end{cases}$$

Where, g represents a rated power of the wind turbine; $v_{in}$ represents a cut-in wind speed of the wind turbine; $v_R$ represents a rated wind speed of the wind turbine; $v_{out}$ represents a cut-out wind speed of the wind turbine; $v_t$ represents a real-time wind speed of the wind turbine at time t; t denotes the specific moment; and $g_{WPP}(t)$ represents an actual output of the wind turbine at time t.

The actual output of the wind turbine meets the following constraint condition:

$$g_{WPP}{}^{min} \le g_{WPP}(t) \le g_{WPP}{}^{max}$$

Where, $g_{WPP}{}^{min}$ represents a lower power limit of the wind turbine, and $g_{WPP}{}^{max}$ represents an upper power limit of the wind turbine.

The pre-demand-response heat load demand model is:

$$Q_{heart}^1(t) = \sum_{t=1}^{24}(C_{air}\rho_{air}NSH + \partial KA)(T_{PMV}^1 - T_{out}(t)) - Q_{inc} - Q_{inh}$$

Where, $Q_{heart}^1(t)$ represents the pre-demand response heat load demand; $\partial$ a represents a modified temperature difference factor of an envelope enclosure; K represents a heat transfer coefficient of the envelope enclosure; A represents an area of the envelope enclosure; $T_{out}(t)$ represents an outdoor temperature at time t; $C_{air}$ represents a specific heat capacity of air; $\rho_{air}$ represents an air density; N represents an air change rate; S represents an area of a building; H represents an indoor height of the building; $Q_{ine}$ represents a calorific value of an electrical equipment; $Q_{inh}$ represents a calorific value of a human body; and $T_{PMV}^1$ represents a pre-demand-response set indoor temperature.

The pre-demand-response set indoor temperature $T_{PMV}^1$ is obtained by the following formula:

$$T_{PMV}^1 = T_S - \frac{M(2.43 - \lambda_{PMV}^1)(I_{cl} + 0.1)}{3.76}$$

Where, $T_s$ represents a human skin temperature in a normal temperature state; M represents a human energy metabolism rate; $\lambda_{PMV}^1$ represents an initial PMV (Predicted Mean Vote) index; and $I_{ci}$ represents a dress heat resistance.

The pre-demand-response electrical boiler output model is:

$$Q_{EB}^1(t) = g_{EB}^1(t) \cdot \eta_{EB}$$

Where, $Q_{EB}^1(t)$ represents a pre-demand-response heat supply of the electrical boiler at the time t; $g_{EB}^1(t)$ represents the pre-demand-response wind power consumption of the electrical boiler at time t; and $\eta_{EB}$ represents an electricity-heat conversion efficiency.

A pre-demand-response actual output of the electrical boiler meets the following constraint condition:

$$Q_{EB}^{1min} \leq Q_{EB}^{1}(t) \leq Q_{EB}^{1max}$$

Where, $Q_{EB}^{1min}$ represents a pre-demand-response lower power limit of the electrical boiler, $Q_{EB}^{1max}$ represents a pre-demand-response upper power limit of the electrical boiler; and $Q_{EB}^{1}(t)$ represents the pre-demand-response actual output of the electrical boiler at the moment t.

$Q_{EB}^{1}(t)$ is equal to $Q_{heart}^{1}(t)$; and an pre-demand-response output of the electrical boiler at time t is obtained based on the pre-demand-response heat load demand $Q_{heart}^{1}(t)$, and then the pre-demand-response wind power consumption $g_{EB}^{1}(t)$ of the electrical boiler is obtained based on the pre-demand-response electrical boiler output model.

The pre-demand-response abandoned wind power per moment and the pre-demand-response total abandoned wind power are obtained by the following formulas, respectively:

$$g_W^1(t) = g_{WPP}(t) - g_E^1(t) - g_{EB}^1(t)$$

$$g_W^1 = \sum_{t=1}^{24} g_W^1(t)$$

Where, $g_W^1$ represents the pre-demand-response total abandoned wind power; $g_W^1(t)$ represents the pre-demand-response abandoned wind power at time t; $g_E^1(t)$ represents the pre-demand-response electrical load demand at time t; and $g_{EB}^1(t)$ represents the pre-demand-response wind power consumption of the electrical boiler.

The post-demand-response heat load demand model is:

$$Q_{heart}^2(t) = \sum_{t=1}^{24}(C_{air}\rho_{air}NSH + \partial KA)(T_{PMV}^2 - T_{out}(t)) - Q_{inc} - Q_{inh}$$

Where, $Q_{heart}^2(t)$ represents the post-demand response heat load demand; $T_{PMV}^2$ represents a post-demand-response set indoor temperature; $\partial$ represents the modified temperature difference factor of an envelope enclosure; K represents the heat transfer coefficient of the envelope enclosure; A represents the area of the envelope enclosure; $T_{out}(t)$ represents the outdoor temperature at time t; $C_{air}$ represents the specific heat capacity of air; $\rho_{air}$ represents the air density; N represents the air change rate; S represents the area of a building; H represents the indoor height of the building; $Q_{ine}$ represents the calorific value of the electrical equipment; $Q_{inh}$ represents the calorific value of the human body.

The post-demand-response set indoor temperature $T_{PMV}^2$ is obtained by the following formula:

$$T_{PMV}^2 = T_S - \frac{M(2.43 - \lambda_{PMV}^2)(I_{cl} + 0.1)}{3.76}$$

Where, $T_s$ represents the human skin temperature in normal temperature state; M represents the human energy metabolism rate; $\lambda_{PMV}^2$ represents the initial PMV index; and $I_{cl}$ represents the dress heat resistance.

The post-demand-response electrical boiler output model is:

$$Q_{EB}^2(t) = g_{EB}^2(t) \cdot \eta_{EB}$$

Where, $Q_{EB}^2(t)$ represents a post-demand-response heat supply of the electrical boiler at the time t; $g_{EB}^2(t)$ represents the post-demand-response wind power consumption of the electrical boiler at time t; and $\eta_{EB}$ represents an electricity-heat conversion efficiency.

A post-demand-response actual output of the electrical boiler meets the following constraint condition:

$$Q_{EB}^{2min} \leq Q_{EB}^{2}(t) \leq Q_{EB}^{2max}$$

Where, $Q_{EB}^{2min}$ represents a post-demand-response lower power limit of the electrical boiler; $Q_{EB}^{2max}$ represents a post-demand-response upper power limit of the electrical boiler; and $Q_{EB}^{2}(t)$ represents the post-demand-response actual output of the electrical boiler at the moment t.

$Q_{EB}^{2}(t)$ is equal to $Q_{heart}^{2}(t)$; and an post-demand-response output of the electrical boiler at time t is obtained based on the post-demand-response heat load demand $Q_{heart}^{2}(t)$, and then the post-demand-response wind power consumption $g_{EB}^{2}(t)$ of the electrical boiler is obtained based on the post-demand-response electrical boiler output model.

The demand of the post-demand-response electrical load demand is obtained by following steps:

calculating variations of the post-demand-response electrical load per moment by the following formulas:

$$\Delta g_{on}(t) = e_{on} \times g_{on}(t) \times \frac{\Delta P_{on}(t)}{P_{on}(t)}, t \in T_{on}$$

$$\Delta g_{mind}(t) = e_{mind} \times g_{mind}(t) \times \frac{\Delta P_{min\ d}(t)}{P_{min\ d}(t)}, t \in T_{mind}$$

$$\Delta g_{off}(t) = e_{off} \times g_{off}(t) \times \frac{\Delta P_{off}(t)}{P_{off}(t)}, t \in T_{off}$$

where, $\Delta g_{on}(t)$, $\Delta g_{mind}(t)$ and $\Delta g_{off}(t)$, respectively, represents a variation of the post-demand-response electrical load at the peak period, the flat period, and the valley period of power consumption; $g_{on}(t)$, $g_{mind}(t)$ and $g_{off}(t)$, respectively, represents the pre-demand-response electrical load at the peak period, the flat period, and the valley period of power consumption; $P_{on}(t)$, $P_{mind}(t)$ and $P_{off}(t)$, respectively, represents the pre-demand-response energy consumption at the peak period, the flat period, and the valley period of power consumption; $\Delta P_{on}(t)$, $\Delta P_{mind}(t)$ and $\Delta P_{off}(t)$, respectively, represents a variation of energy consumption at the peak period, the flat period, and the valley period of power consumption; $e_{on}$, $e_{mind}$ and $e_{off}$, respectively, represents an elastic coefficient of energy consumption at the peak period, the flat period, and the valley period of power consumption; and $T_{on}$ represents the peak period of energy consumption, $T_{mind}$ represents the flat period of energy consumption, and $T_{off}$ represents the valley period of energy consumption; and obtaining the post-demand-response electrical load per moment $g_{EB}^2(t)$ by adding variations of the post-demand-response electrical load per moment and the pre-demand-response electrical load per moment $g_{EB}^1(t)$.

The post-demand-response abandoned wind power per moment and the post-demand-response total abandoned wind power are respectively obtained by the following formulas:

$$g_W^2(t) = g_{WPP}(t) - g_E^2(t) - g_{EB}^2(t)$$

$$g_W^2 = \sum_{t=1}^{24} g_W^2(t)$$

Where, $g_W^2$ represents the post-demand-response total abandoned wind power; $g_W^2(t)$ represents the post-demand-response abandoned wind power at time t; $g_E^2(t)$ represents the post-demand-response electrical load demand at time t; and $g_{EB}^2(t)$ represents the post-demand-response wind power consumption of the electrical boiler at time t.

The storage battery capacity model is:

$$S_{soc}(t) = S_{soc}(t-1) + (S_{ch}(t) - S_{dis}(t))$$

$$S_{ch}(t) = g_{ch}(t)\eta_{ch}$$

$$S_{dis}(t) = g_{dis}(t)\eta_{dis}$$

Where, $S_{soc}(t)$ represents the capacitance of the storage battery at time t; $S_{soc}(t-1)$ represents the capacitance of the storage battery at time t−1; $S_{ch}(t)$ represents the charging capacity of the storage battery at time t; $S_{dis}(t)$ represents the discharging capacity of the storage battery at time t; $g_{ch}(t)$ represents the charging power of the storage battery at time t; $\eta_{ch}$ represents the charging efficiency of the storage battery; $g_{dis}(t)$ represents the discharging power of the storage battery at time t; and $\eta_{dis}$ represents the discharging efficiency of the storage battery.

The capacity of the storage battery meets the following constraint condition:

$$S_{soc}^{min}(t) \leq S_{soc}(t) \leq S_{soc}^{max}(t)$$

Where, $S_{soc}^{min}(t)$ represents the minimum charging capacity of the storage battery, and the $S_{soc}^{max}(t)$ represents the maximum charging capacity of the storage battery.

The output constraint of the storage battery meets the following constraint condition:

$$g_{ch}^{min} \leq g_{ch}(t) \leq g_{ch}^{max}$$

$$g_{dis}^{min} \leq g_{dis}(t) \leq g_{dis}^{max}$$

Where, $g_{ch}^{min}$ represents the minimum charging power of the storage battery; $g_{ch}^{max}$ represents the maximum charging power of the storage battery; $g_{dis}^{min}$ represents the minimum discharging power of the storage battery; and $g_{dis}^{max}$ represents the maximum discharging power of the storage battery.

When the actual output $g_{WPP}(t)$ of the wind turbine at time t is less than the sum of $g_{EB}^2(t)$ and $g_E^2(t)$, the $g_W^2(t)$ is less than 0; and when the actual output $g_{WPP}(t)$ of the wind turbine at time t is greater than or equal to the sum of $g_{EB}^2(t)$ and $g_E^2(t)$, the $g_W^2(t)$ is greater than or equal to 0.

when the post-demand-response abandoned wind power at time t, $g_W^2(t)$, is less than 0, the storage battery is configured to assist in power supply to the electrical boiler and the electrical load.

When the post-demand-response abandoned wind power at time t, $g_W^2(t)$, is greater than or equal to 0, the storage battery is configured receive power from the wind turbine, and the charging capacity of the storage battery at time t, $S_{ch}(t)$, is equal to the post-demand-response abandoned wind power at time t, $g_W^2(t)$. Namely, $g_W^2(t) = S_{ch}(t)$.

The discharging capacity of the storage battery at time t, $S_{dis}(t)$ is equal to an absolute value of the post-demand-response abandoned wind power at time t, $g_W^2(t)$. Namely, $|g_W^2(t)| = S_{dis}(t)$.

The working principle of the storage battery is: under the conditions that the wind power is sufficient, and abandoned wind is generated, the abandoned wind quantity is stored; when the wind power is insufficient to provide the required electrical loads, the storage battery is configured to discharge to assist the wind turbine to supply power.

Figure 2:
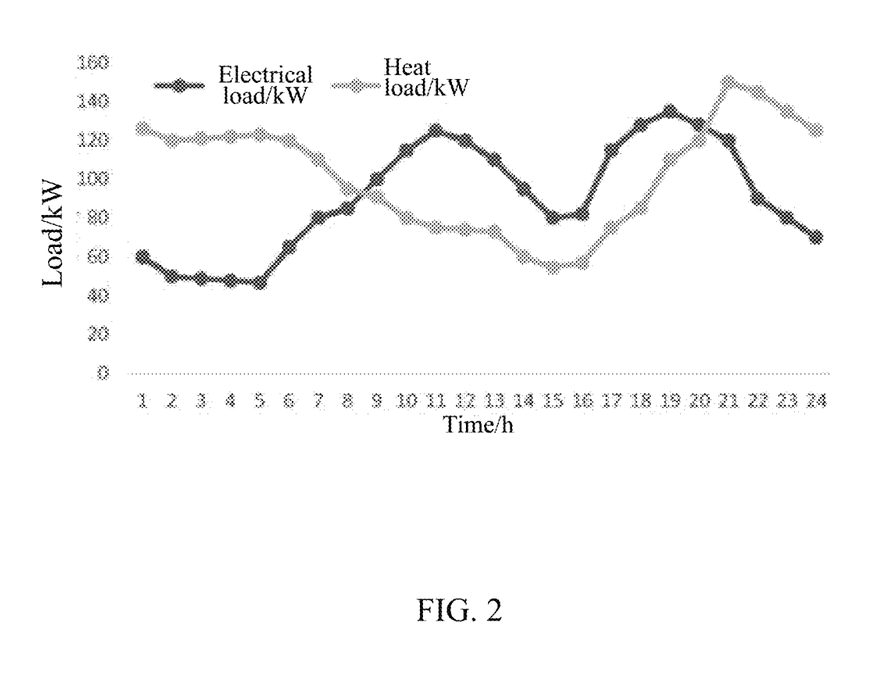
FIG. 2 is a diagram of a demand curve of electrical loads and heat loads in an embodiment of the present invention.
Figure 3:
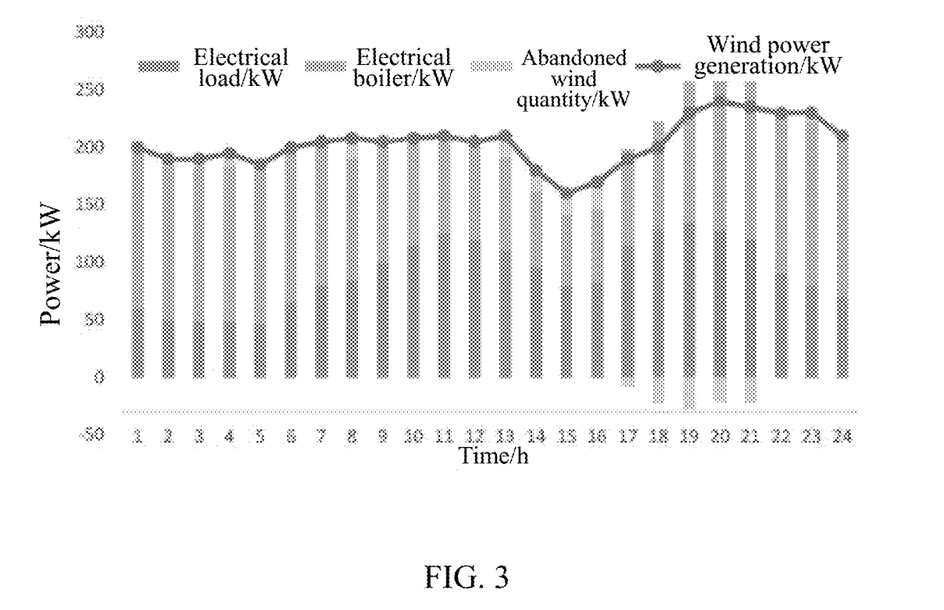
FIG. 3 is a diagram of the condition of wind power consumption in a scenario 1 of the embodiment of the present invention.

In the embodiments, a virtual power plant which comprises a wind turbine, a storage battery and an electrical boiler is taken as an example. The output condition of the wind turbine is shown in FIG. 2. The initial capacity of the storage battery is 0 kWh. A demand curve of electrical loads and heat loads is shown in FIG. 3. The uniform energy consumption cost before demand responses is 0.5/kWh; after peak-valley energy consumption is adopted, the peak period of energy consumption is 11:00-15:00 and 19:00-21:00; the cost at the peak period of energy consumption is 0.8/kWh; and the corresponding elastic coefficient $e_{on}$ of energy consumption is −0.07. The flat period of energy consumption is 08:00-10:00, 16:00-18:00 and 22:00-23:00; the cost at the flat period of energy consumption is 0.4/kWh; and the corresponding elastic coefficient $e_{mind}$ of energy consumption is 0.05. The valley period of energy consumption is 24:00-07:00; the cost at the valley period of energy consumption is 0.2/kWh; and the corresponding elastic coefficient $e_{off}$ of energy consumption is 0.08. In the embodiments, two scenarios are considered. In the first scenario, energy storage equipment is not considered, and the demand responses are not implemented on the electrical loads and the heat loads. In the second scenario, the energy storage equipment is considered, and comprehensive demand responses are implemented on the electrical loads and the heat loads. In the embodiment, the abandoned wind quantities of the virtual power plant in the two scenarios are respectively calculated and are compared with each other.

Figure 4:
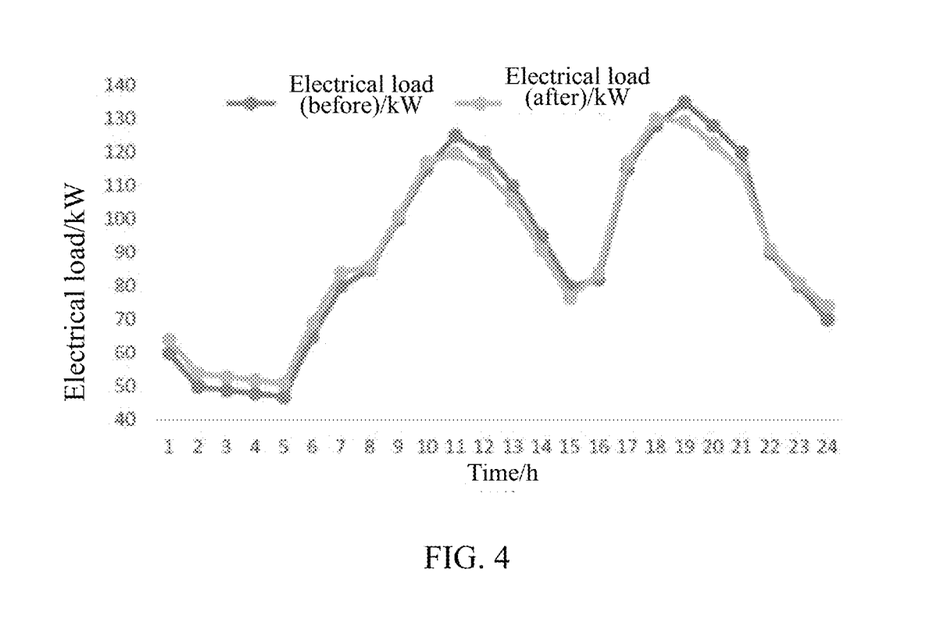
FIG. 4 is a diagram of a demand change curve after demand responses of the electrical loads in the embodiment of the present invention.
Figure 5:
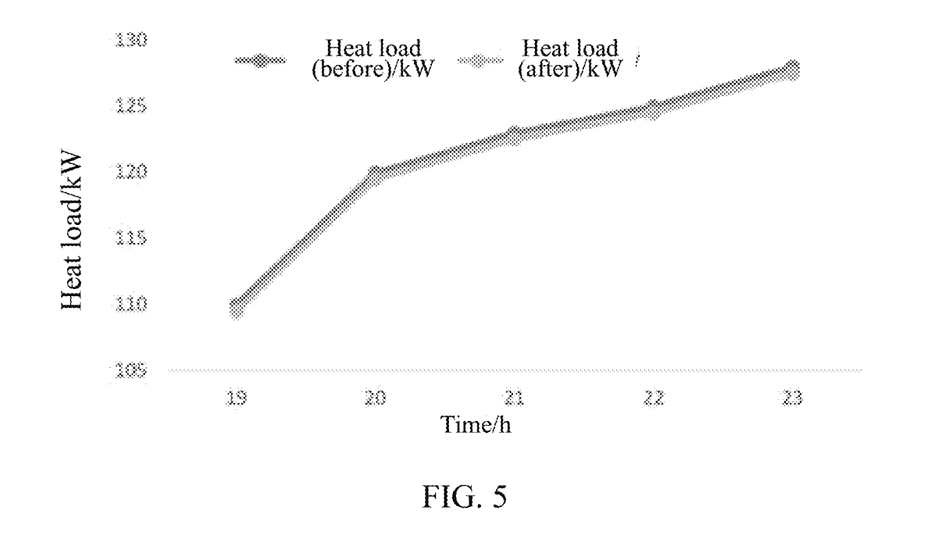
FIG. 5 is a diagram of a demand change curve after demand responses of the heat loads in the embodiment of the present invention.
Figure 6:
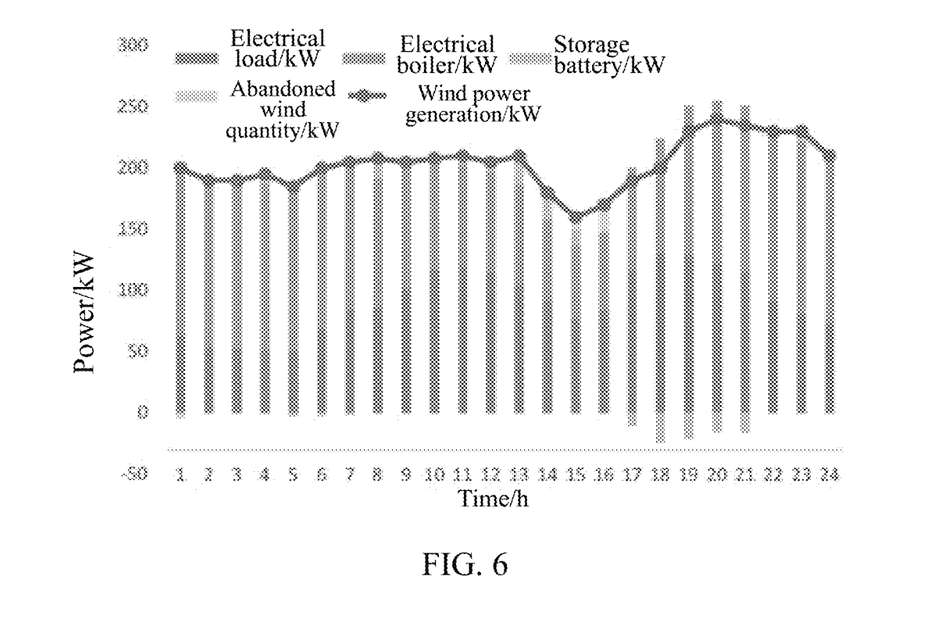
FIG. 6 is a diagram of the condition of wind power consumption in a scenario 2 of the embodiment of the present invention.

The virtual power plant in the embodiment is mainly used for wind power consumption for the power utilization of users and the electricity to heat conversion of the electrical boiler. In the scenario 2, the demand of the electrical loads after the demand responses is obtained according to the elastic cost coefficients of the electrical loads at different periods. It can be seen from FIG. 4 that peak load shifting of the electrical loads is realized by the demand responses. At the demand peak period of the heat loads, incentive demand responses are implemented by lowering the set indoor temperature $T_{PMV}$, and the compensation cost for the demand responses of the virtual power plant is considered to be minimum. In the embodiment, the incentive demand responses of the heat loads are implemented at the common peak period (19:00-23:00) of the electrical loads and the heat loads. It can be seen from FIG. 5 that the curtailment of the heat loads is realized by the demand responses; meanwhile, when the abandoned wind quantity is larger, the storage battery is configured to store energy, so as to promote wind power consumption. Through comparison on the conditions of wind power consumption in the two scenarios, as shown in Tab. 1, it is found that the abandoned wind quantity in the scenario 2 is reduced, and the consumption capacity is higher.

TABLE 1

Table of conditions of wind power consumption
of a virtual power plant in two scenarios

|  | Scenario 1 | Scenario 2 |
| --- | --- | --- |
| Wind power generation/kW | 4886 | 4886 |
| Electrical load/kW | 2177 | 2184.3 |
| Output of electrical boiler/kW | 2656.66 | 2653.89 |
| Output of storage battery/kW | 0 | 12.76 |
| Abandoned wind quantity/kW | 52.34 | 35.05 |

Therefore, the comprehensive responses of the electrical loads and the heat loads are considered in the present invention, the capacity of wind power consumption of the virtual power plant is effectively improved; the reference is provided for a research that the comprehensive demand responses are implemented on various loads; and an effective way is provided for promoting wind power consumption of a power generation and distribution system, such as the virtual power plant and the like and relieving the problem of wind abandonment.

Finally, it should be noted that the above example is only used for describing the technical solution of the present invention, rather than the limit to technical solution of the present invention. Although the present invention is described with reference to the above example, those skilled in the art should understand that a specific implementation manner of the present invention can still be modified or equivalently replaced, and any modification or equivalent replacement made without departing from the spirit and the scope of the present invention shall be covered in the scope of the claims of the present invention.

We claim:

1. A method for consuming wind power in a virtual plant with consideration of comprehensive demand response for electrical loads and heat loads, comprising the following steps:
providing the virtual power plant which comprises an electrical boiler, a storage battery and a wind turbine; wherein the wind turbine is capable of supplying power to the electrical boiler and an electrical load; the storage battery is capable of supplying power to the electrical load, and assisting power supply to the electrical boiler; the electrical boiler is capable of providing heat supply to a heat load;
establishing a wind turbine power model to obtain a wind power prediction curve;
establishing a pre-demand-response heat load demand model and a pre-demand-response electrical boiler output model; determining a pre-demand-response heat load demand based on the pre-demand-response heat load demand model; calculating a pre-demand-response wind power consumption of the electrical boiler according to the pre-demand-response electrical boiler output model and the pre-demand-response heat load demand; calculating a pre-demand-response abandoned wind power per moment and a pre-demand-response total abandoned wind power according to the wind power prediction curve, a pre-demand-response electrical load demand, and the pre-demand-response wind power consumption of the electrical boiler;
establishing a post-demand-response heat load demand model and a post-demand-response electrical boiler output model; determining a post-demand-response heat load demand based on the post-demand-response heat load demand model; calculating a post-demand-response wind power consumption of the electrical boiler according to the post-demand-response electrical boiler output model and the post-demand-response heat load demand;
calculating a post-demand-response electrical load demand; calculating a post-demand-response abandoned wind power per moment and a post-demand-response total abandoned wind power according to the wind power prediction curve, the post-demand-response electrical load demand, and the post-demand-response wind power consumption of the electrical boiler; then obtaining a difference value between the pre-demand-response total abandoned wind power and the post-demand-response total abandoned wind power; promoting wind power consumption if the difference value is greater than 0; and
establishing a storage battery capacity model; determining a charging-discharging state and a charging-discharging ability of the storage battery according to the storage battery capacity model and the post-demand-response abandoned wind power per moment.

2. The method according to claim 1, wherein the wind turbine output model is:

$$g_{WPP}(t) = \begin{cases} 0, & v_t \leq v_{in} \\ \dfrac{v_t - v_{in}}{v_R - v_{in}} g, & v_{in} \leq v_t \leq v_R \\ g, & v_R \leq v_t \leq v_{out} \\ 0, & v_t \geq v_{out} \end{cases}$$

where, g represents a rated power of the wind turbine; $v_{in}$ represents a cut-in wind speed of the wind turbine; $v_R$ represents a rated wind speed of the wind turbine; $v_{out}$ represents a cut-out wind speed of the wind turbine; $v_t$ represents a real-time wind speed of the wind turbine at time t; t denotes the specific moment; and $g_{WPP}(t)$ represents an actual output of the wind turbine at time t; and the actual output of the wind turbine meets the following constraint condition:

$$g_{WPP}^{min} \leq g_{WPP}(t) \leq g_{WPP}^{max}$$

where, $g_{WPP}^{min}$ represents a lower power limit of the wind turbine, and $g_{WPP}^{max}$ represents an upper power limit of the wind turbine.

3. The method according to claim 1, wherein the pre-demand-response heat load demand model is:

$$Q_{heart}^1(t) = \sum_{t=1}^{24}(C_{air}\rho_{air}NSH + \partial KA)\left(T_{PMV}^1 - T_{out}(t)\right) - Q_{inc} - Q_{inh}$$

where, $Q_{heart}^1(t)$ represents the pre-demand response heat load demand; $\partial$ represents a modified temperature difference factor of an envelope enclosure; K represents a heat transfer coefficient of the envelope enclosure; A represents an area of the envelope enclosure; $T_{out}(t)$ represents an outdoor temperature at time t; $C_{air}$ represents a specific heat capacity of air; $\rho_{air}$ represents an air density; N represents an air change rate; S represents an area of a building; H represents an indoor height of the building; $Q_{inc}$ represents a calorific value of an electrical equipment; $Q_{inh}$ represents a calorific value of a human body; and $T_{PMV}^1$ represents a pre-demand-response set indoor temperature;

the pre-demand-response set indoor temperature $T_{PMV}^1$ is obtained by the following formula:

$$T_{PMV}^1 = T_S - \frac{M(2.43 - \lambda_{PMV}^1)(I_{cl} + 0.1)}{3.76}$$

where, $T_s$ represents a human skin temperature in a normal temperature state; M represents a human energy metabolism rate; $\lambda_{PMV}^1$ represents an initial PMV (Predicted Mean Vote) index; and $I_{cl}$ represents a dress heat resistance;

the pre-demand-response electrical boiler output model is:

$$Q_{EB}^1(t) = g_{EB}^1(t) \cdot \eta_{EB}$$

where, $Q_{EB}^1(t)$ represents a pre-demand-response heat supply of the electrical boiler at the time t; $g_{EB}^1(t)$ represents the pre-demand-response wind power consumption of the electrical boiler at time t; and $\eta_{EB}$ represents an electricity-heat conversion efficiency;

a pre-demand-response actual output of the electrical boiler meets the following constraint condition:

$$Q_{EB}^{1min} \leq Q_{EB}^1(t) \leq Q_{EB}^{1max}$$

where, $Q_{EB}^{1min}$ represents a pre-demand-response lower power limit of the electrical boiler; $Q_{EB}^{1max}$ represents a pre-demand-response upper power limit of the electrical boiler; and $Q_{EB}^1(t)$ represents the pre-demand-response actual output of the electrical boiler at the moment t.

4. The method according to claim 3, wherein $Q_{EB}^1(t)$ is equal to $Q_{heart}^1(t)$; and an pre-demand-response output of the electrical boiler at time t is obtained based on the pre-demand-response heat load demand $Q_{heart}^1(t)$, and then the pre-demand-response wind power consumption $g_{EB}^1(t)$ of the electrical boiler is obtained based on the pre-demand-response electrical boiler output model.

5. The method according to claim 1, wherein the pre-demand-response abandoned wind power per moment and the pre-demand-response total abandoned wind power are obtained by the following formulas, respectively:

$$g_W^1(t) = g_{WPP}(t) - g_E^1(t) - g_{EB}^1(t)$$

$$g_W^1 = \sum_{t=1}^{24} g_W^1(t)$$

where, $g_W^1$ represents the pre-demand-response total abandoned wind power; $g_W^1(t)$ represents the pre-demand-response abandoned wind power at time t; $g_E^1(t)$ represents the pre-demand-response electrical load demand at time t; and $g_{EB}^1(t)$ represents the pre-demand-response wind power consumption of the electrical boiler.

6. The method according to claim 1, wherein the post-demand-response heat load demand model is:

$$Q_{heart}^2(t) = \sum_{t=1}^{24}(C_{air}\rho_{air}NSH + \partial KA)(T_{PMV}^2 - T_{out}(t)) - Q_{inc} - Q_{inh}$$

where, $Q_{heart}^2(t)$ represents the post-demand response heat load demand; $T_{PMV}^2$ represents a post-demand-response set indoor temperature; $\partial$ represents the modified temperature difference factor of an envelope enclosure; K represents the heat transfer coefficient of the envelope enclosure; A represents the area of the envelope enclosure; $T_{out}(t)$ represents the outdoor temperature at time t; $C_{air}$ represents the specific heat capacity of air; $\rho_{air}$ represents the air density; N represents the air change rate; S represents the area of a building; H represents the indoor height of the building; $Q_{inc}$ represents the calorific value of the electrical equipment; $Q_{inh}$ represents the calorific value of the human body;

the post-demand-response set indoor temperature $T_{PMV}^2$ is obtained by the following formula:

$$T_{PMV}^2 = T_S - \frac{M(2.43 - \lambda_{PMV}^2)(I_{cl} + 0.1)}{3.76}$$

where, $T_s$ represents the human skin temperature in normal temperature state; M represents the human energy metabolism rate; $\lambda_{PMV}^2$ represents the initial PMV index; and $I_{cl}$ represents the dress heat resistance;

the post-demand-response electrical boiler output model is:

$$Q_{EB}^2(t) = g_{EB}^2(t) \cdot \eta_{EB}$$

where, $Q_{EB}^2(t)$ represents a post-demand-response heat supply of the electrical boiler at the time t; $g_{EB}^2(t)$ represents the post-demand-response wind power consumption of the electrical boiler at time t; and $\eta_{EB}$ represents an electricity-heat conversion efficiency;

a post-demand-response actual output of the electrical boiler meets the following constraint condition:

$$Q_{EB}^{2min} \leq Q_{EB}^2(t) \leq Q_{EB}^{2max}$$

where, $Q_{EB}^{2min}$ represents a post-demand-response lower power limit of the electrical boiler; $Q_{EB}^{2max}$ represents a post-demand-response upper power limit of the electrical boiler; and $Q_{EB}^2(t)$ represents the post-demand-response actual output of the electrical boiler at the moment t.

7. The method according to claim 6, wherein $Q_{EB}^2(t)$ is equal to $Q_{heart}^2(t)$; and an post-demand-response output of the electrical boiler at time t is obtained based on the post-demand-response heat load demand $Q_{heart}^2(t)$, and then the post-demand-response wind power consumption $g_{EB}^2(t)$ of the electrical boiler is obtained based on the post-demand-response electrical boiler output model.

8. The method according to claim 5, wherein the demand of the post-demand-response electrical load demand is obtained by following steps:

calculating variations of the post-demand-response electrical load demand per moment by the following formulas:

$$\Delta g_{on}(t) = e_{on} \times g_{on}(t) \times \frac{\Delta P_{on}(t)}{P_{on}(t)}, t \in T_{on}$$

$$\Delta g_{mind}(t) = e_{mind} \times g_{mind}(t) \times \frac{\Delta P_{mind}(t)}{P_{mind}(t)}, t \in T_{mind}$$

$$\Delta g_{off}(t) = e_{off} \times g_{off}(t) \times \frac{\Delta P_{off}(t)}{P_{off}(t)}, t \in T_{off}$$

where, $\Delta g_{on}(t)$, $\Delta g_{mind}(t)$ and $\Delta g_{off}(t)$, respectively, represents a variation of the post-demand-response electrical load demand at the peak period, the flat period, and the valley period of power consumption; $g_{on}(t)$, $g_{mind}(t)$ and $g_{off}(t)$, respectively, represents the pre-demand-response electrical load demand at the peak period, the flat period, and the valley period of power consumption; $P_{on}(t)$, $P_{mind}(t)$ and $P_{off}(t)$, respectively, represents the pre-demand-response energy consumption at the peak period, the flat period, and the valley period of power consumption; $\Delta P_{on}(t)$, $\Delta P_{mind}(t)$ and $\Delta P_{off}(t)$, respectively, represents a variation of energy consumption at the peak period, the flat period, and the valley period of power consumption; $e_{on}$, $e_{mind}$ and $e_{off}$, respectively, represents an elastic coefficient of energy consumption at the peak period, the flat period, and the valley period of power consumption; and $T_{on}$ represents a peak period of energy consumption, $T_{mind}$ represents a flat period of energy consumption, and $T_{off}$ represents a valley period of energy consumption; and obtaining the post-demand-response electrical load demand per moment $g_E^2(t)$ by adding variations of the post-demand-response electrical load demand per moment and the pre-demand-response electrical load demand per moment $g_E^1(t)$.

9. The method according to claim 1, wherein the post-demand-response abandoned wind power per moment and the post-demand-response total abandoned wind power are respectively obtained by the following formulas:

$$g_W^2(t) = g_{WPP}(t) - g_E^2(t) - g_{EB}^2(t)$$

$$g_W^2 = \sum_{t=1}^{24} g_W^2(t)$$

where, $g_W^2$ represents the post-demand-response total abandoned wind power; $g_W^2(t)$ represents the post-demand-response abandoned wind power at time t; $g_E^2(t)$ represents the post-demand-response electrical load demand at time t; and $g_{EB}^2(t)$ represents the post-demand-response wind power consumption of the electrical boiler at time t.

10. The method according to claim 1, wherein the storage battery capacity model is:

$$S_{soc}(t) = S_{soc}(t-1) + (S_{ch}(t) - S_{dis}(t))$$

$$S_{ch}(t) = g_{ch}(t)\eta_{ch}$$

$$S_{dis}(t) = g_{dis}(t)\eta_{dis}$$

where, $S_{soc}(t)$ represents a capacitance of the storage battery at time t; $S_{soc}(t-1)$ represents a capacitance of the storage battery at time t−1; $S_{ch}(t)$ represents a charging ability of the storage battery at time t; $S_{dis}(t)$ represents a discharging capacity of the storage battery at time t; $g_{ch}(t)$ represents a charging power of the storage battery at time t; $\eta_{ch}$ represents a charging efficiency of the storage battery; $g_{dis}(t)$ represents a discharging power of the storage battery at time t; and $\eta_{dis}$ represents a discharging efficiency of the storage battery;

the capacity of the storage battery meets the following constraint condition:

$$S_{soc}^{min}(t) \le S_{soc}(t) \le S_{soc}^{max}(t)$$

where, $S_{soc}^{min}(t)$ represents a minimum charging ability of the storage battery, and the $S_{soc}^{max}(t)$ represents a maximum charging ability of the storage battery;

the output constraint of the storage battery meets the following constraint condition:

$$g_{ch}^{min} \le g_{ch}(t) \le g_{ch}^{max}$$

$$g_{dis}^{min} \le g_{dis}(t) \le g_{dis}^{max}$$

where, $g_{ch}^{min}$ represents a minimum charging power of the storage battery; $g_{ch}^{max}$ represents a maximum charging power of the storage battery; $g_{dis}^{min}$ represents a minimum discharging power of the storage battery; and $g_{dis}^{max}$ represents a maximum discharging power of the storage battery;

when an actual output $g_{WPP}(t)$ of the wind turbine at time t is less than a sum of $g_{EB}^2(t)$ and $g_E^2(t)$, the $g_W^2(t)$ is less than 0; and when the actual output $g_{WPP}(t)$ of the wind turbine at time t is greater than or equal to the sum of $g_{EB}^2(t)$ and $g_E^2(t)$, the $g_W^2(t)$ is greater than or equal to 0; and when a post-demand-response abandoned wind power at time t, $g_W^2(t)$, is less than 0, the storage battery is configured to assist in power supply to the electrical boiler and the electrical load;

when the post-demand-response abandoned wind power at time t, $g_W^2(t)$, is greater than or equal to 0, the storage battery is configured receive power from the wind turbine, and the charging ability of the storage battery at time t, $S_{ch}(t)$, is equal to the post-demand-response abandoned wind power at time t, $g_W^2(t)$; and the discharging ability of the storage battery at time t, $S_{dis}(t)$ is equal to an absolute value of the post-demand-response abandoned wind power at time t, $g_W^2(t)$.

* * * * *